Patented Aug. 26, 1930

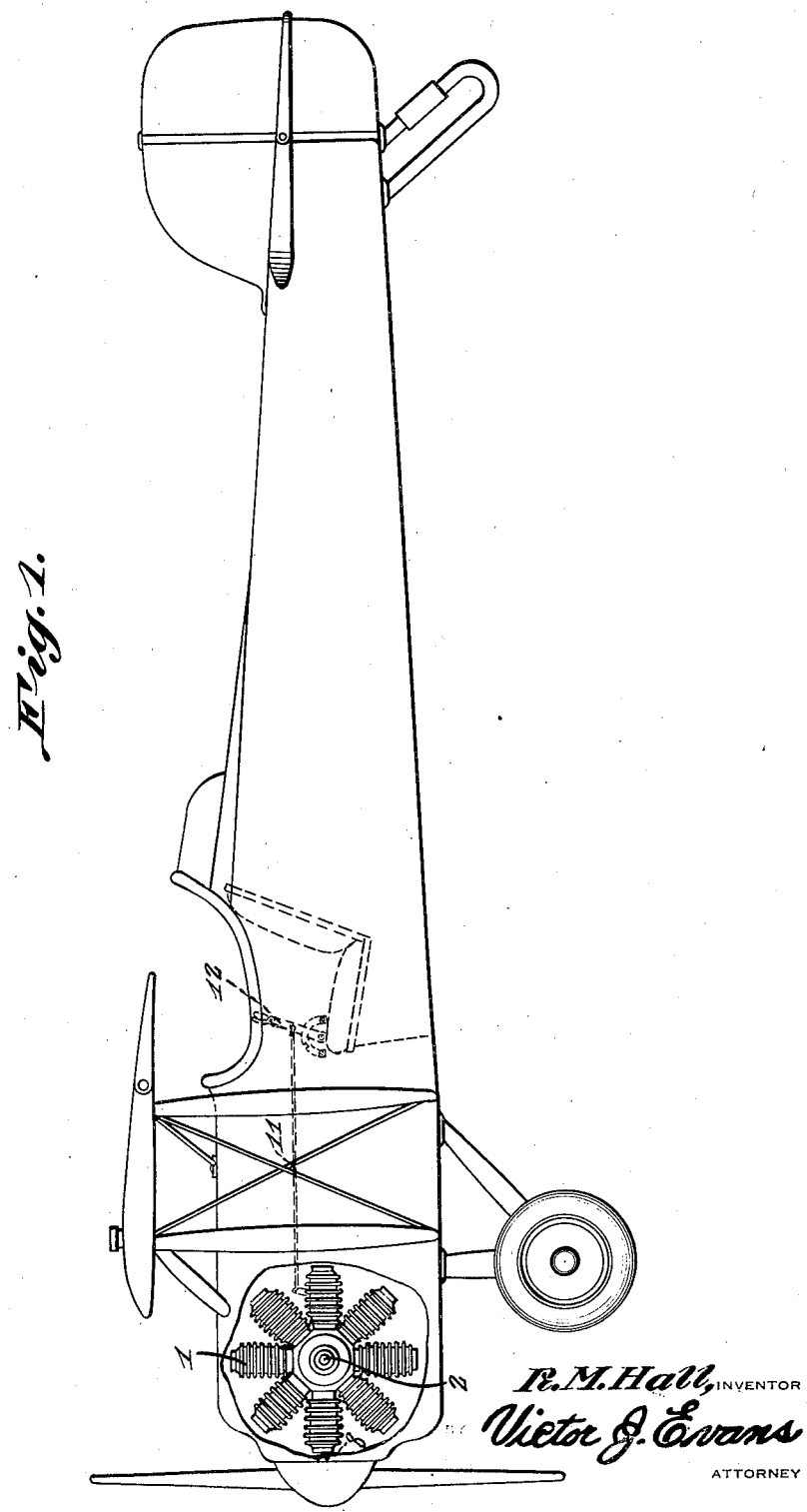

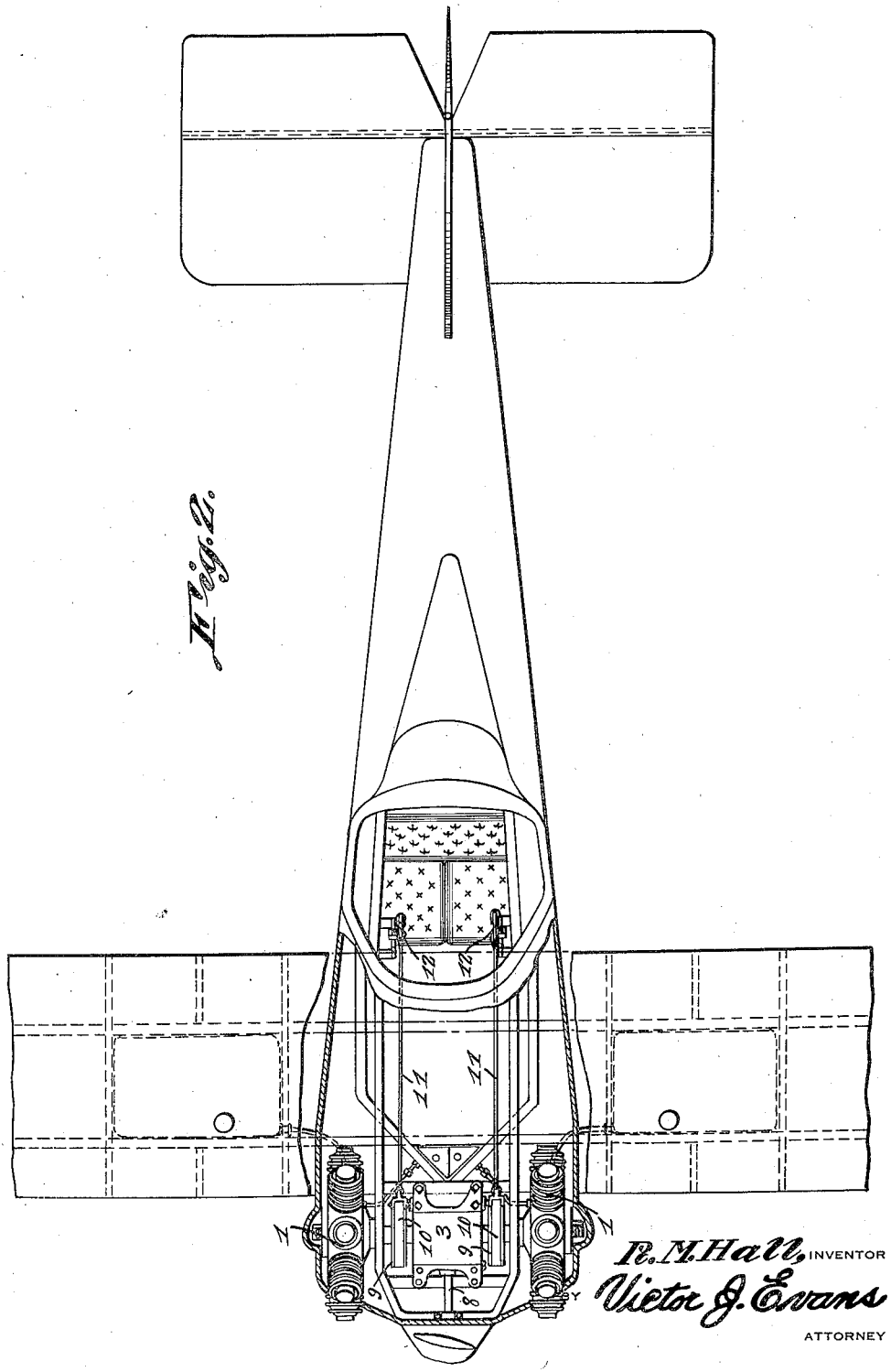

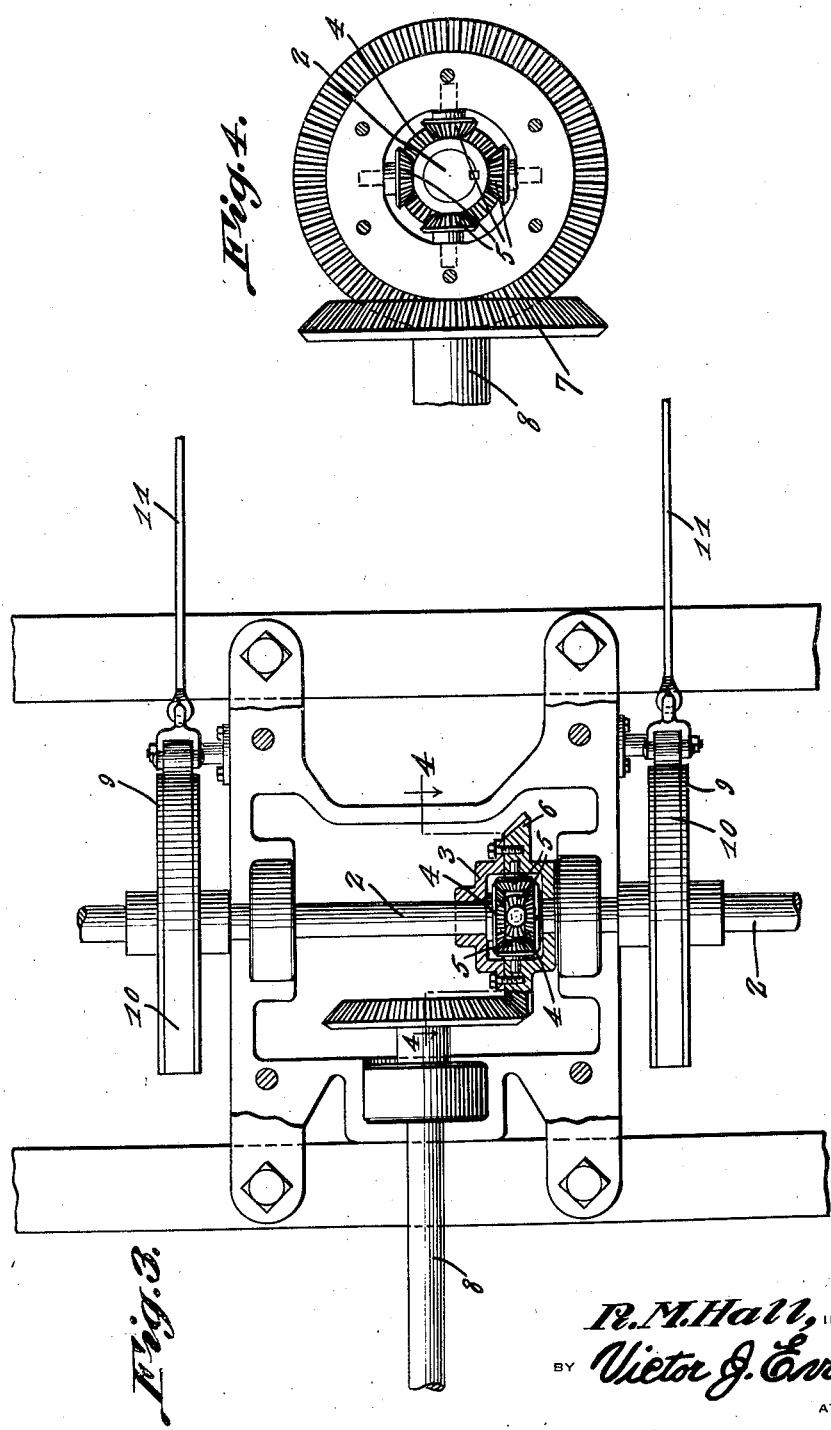

1,774,016

UNITED STATES PATENT OFFICE

ROY MINSHEW HALL, OF BUFFALO, NEW YORK, ASSIGNOR OF ONE-HALF TO THOMAS J. MOORE, OF NEW ORLEANS, LOUISIANA

AERONAUTICAL POWER PLANT

Application filed February 25, 1929. Serial No. 342,446.

This invention relates to aircrafts, the general object of the invention being to provide means for increasing the factor of safety against motor failure by providing a number of engines, with different means for connecting the shafts thereof with the propeller shaft, whereby if one engine should fail, the other engine will continue to drive the propeller and thus prevent the craft from falling.

Another object of the invention is to provide a brake for each engine shaft so that the shaft of the dead engine can be braked to prevent it from acting as a brake to the other engine and thus prevent loss of power to the propeller.

This invention also consists in certain other features of construction and in the combination and arrangement of the several parts, to be hereinafter fully described, illustrated in the accompanying drawings and specifically pointed out in the appended claim.

In describing the invention in detail, reference will be had to the accompanying drawings wherein like characters denote like or corresponding parts throughout the several views, and in which:—

Figure 1 is an elevation, partly in section, showing the invention applied to an aeroplane.

Figure 2 is a top plan view of Figure 1, with parts in section.

Figure 3 is an enlarged plan view, with parts in section, showing the differential means for connecting the engine shafts to the propeller shaft.

Figure 4 is a section on line 4—4 of Figure 3.

In carrying out my invention, I provide a pair of engines 1 which are suitably supported at the front of the fuselage, one on each side of the longitudinal center thereof, with the shafts 2 of the engines extending toward each other, as shown. The inner ends of these shafts extend within a differential housing 3 and a beveled gear 4 is connected to the inner end of each shaft, these gears being located within the housing. The usual group of pinions 5 is suitably connected with the housing and extend between the gears 4 and mesh with said gears. A beveled gear 6 is formed with or connected to the outer part of the housing and meshes with a beveled gear 7 connected with the inner end of the propeller shaft 8.

Thus it will be seen that the power of the engines will be delivered through the differential means to the propeller shaft so as to drive the propeller shaft with equal torque. It will also be seen that if one of the motors should stop for any reason, or the operator stops the motor himself, the other motor will continue to drive the propeller shaft without decreasing the revolutions of the propeller so that the craft will continue in its flight and will not fall.

In order to prevent the dead engine from acting as a brake on the other engine, I provide a brake drum 9 on each shaft 2, the band 10 of which is connected by a link 11 with a hand lever 12 arranged adjacent the pilot's seat so that by contracting the band, the dead motor will be held stationary and will, therefore, not interfere with the functioning of the other engine.

If desired, suitable clutch means may be used to connect and disconnect the engine shafts with the differential means, though such means are not shown, as they can be of any desired type.

While the drawings show the radial type of engines, it will, of course, be understood that other types of engines can be used, though one engine must work in clockwise fashion and the other in anti-clockwise fashion.

It is thought from the foregoing description that the advantages and novel features of the invention will be readily apparent.

It is to be understood that changes may be made in the construction and in the combination and arrangement of the several parts, provided that such changes fall within the scope of the appended claim.

What I claim is:—

In a power unit for aeroplanes, the combination with a fuselage having spaced transverse brace bars at the forward end thereof, of an engine supporting frame arranged between said bars, and formed with apertured lugs projecting from the corners of the frame and secured to said bars, said frame being formed with spaced alined bearings in the sides thereof, and an intermediate bearing in one end thereof, a propeller shaft projecting within the frame and journaled in the last mentioned bearing, a beveled gear carried by the inner end of said shaft, a pair of motors arranged at either side of the fuselage and having their shaft transversely arranged and in alinement, said shaft being journaled in the said spaced bearings, a differential mechanism including a housing supported by said frame and into which the adjacent ends of the engine shaft extend, a beveled gear on the adjacent ends of said shaft and located within the housing, a beveled gear arranged exteriorly of the housing and meshing with the beveled gear of the propeller shaft, and a plurality of beveled pinions arranged within and connected with the housing and meshing with the beveled gears of the engine shaft, whereby power from either or both of said engines is transmitted to the propeller shaft.

In testimony whereof I affix my signature.

ROY MINSHEW HALL.